United States Patent
Chapotelle

Patent Number: 5,863,151
Date of Patent: Jan. 26, 1999

[54] RAINWATER SAVER SYSTEM

[76] Inventor: Dan Chapotelle, 8260 Dalemore Rd., Richmond BC, Canada, V7C 2A8

[21] Appl. No.: 774,760

[22] Filed: Dec. 30, 1996

[51] Int. Cl.[6] .................................................... E02B 13/00
[52] U.S. Cl. ................................. 405/52; 405/36; 52/11; 210/170; 137/236.1; 137/357
[58] Field of Search .................................. 405/36, 37, 43, 405/45; 137/357, 590.5, 616.5, 236.1; 52/11, 14, 16; 239/310, 195, 198; 210/170

[56] References Cited

U.S. PATENT DOCUMENTS

| 1,453,109 | 4/1923 | Hathaway | 137/357 |
| 4,632,342 | 12/1986 | Skinner | 52/11 X |
| 4,700,734 | 10/1987 | McCauley | 137/590.5 X |
| 4,934,404 | 6/1990 | DeStefano | 239/310 X |
| 5,114,594 | 5/1992 | Rosebrock et al. | 137/357 X |
| 5,234,286 | 8/1993 | Wagner | 405/36 X |
| 5,522,427 | 6/1996 | Johnson | 137/616.5 |
| 5,533,303 | 7/1996 | Harvey | 52/16 |

FOREIGN PATENT DOCUMENTS

| 148839 | 12/1978 | Japan | 137/357 |
| 3710690 | 10/1988 | Switzerland | 137/590.5 |
| 2242926 | 10/1991 | United Kingdom | 405/37 |
| 2249338 | 5/1992 | United Kingdom | 52/16 |

Primary Examiner—Tamara L. Graysay
Assistant Examiner—Jong-Suk Lee

[57] ABSTRACT

A new rainwater saver system using the principle of water following a line of least resistance, the rainwater saver system being for collecting water and redistributing it for various purposes. The rainwater saver system includes a housing having a lower and upper exit tube. The lower exit tube is connected to a hose leading to a storage container. The upper tube is connected to a regular drainage system for draining water when the storage container is filled.

15 Claims, 3 Drawing Sheets

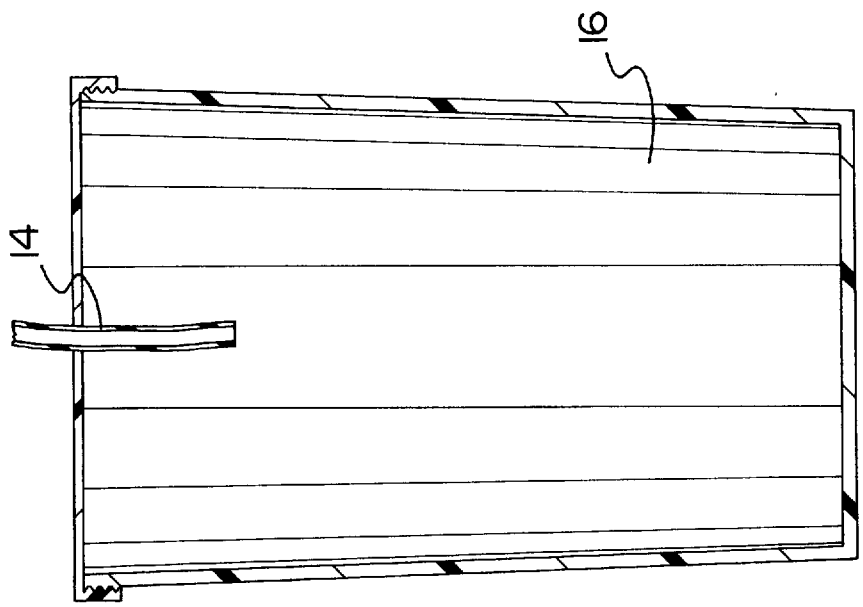
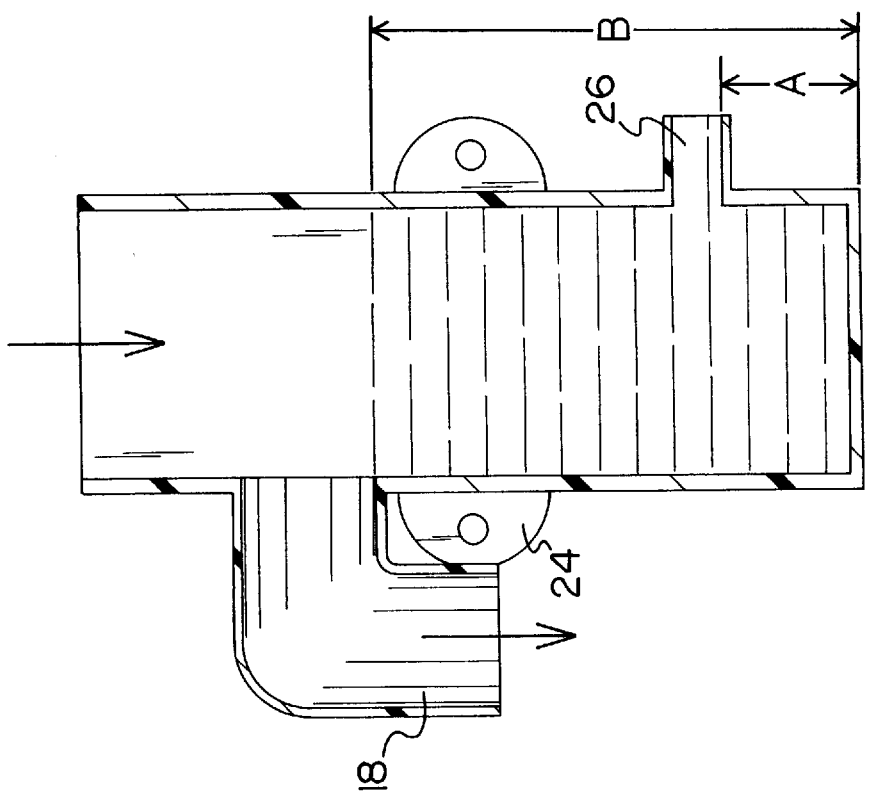
FIG. 6
FIG. 5

RAINWATER SAVER SYSTEM

BACKGROUND OF THE INVENTION

1. Field of the Invention

The present invention relates to water conservation systems and more particularly pertains to a new rainwater saver system for collecting rain water and redistributing it for various purposes.

2. Description of the Prior Art

The use of water conservation systems is known in the prior art. More specifically, water conservation systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art water conservation systems include U.S. Pat. No. 5,234,286; U.S. Pat. No. 4,934,404; U.S. Pat. No. 326,705; U.S. Pat. No. 4,527,927; U.S. Pat. No. 4,335,977 and U.S. Pat. No. 4,589,798.

While these devices fulfill their respective, particular objectives and requirements, the aforementioned patents do not disclose a new rainwater saver system. The inventive device includes an inlet means, a first outlet means, a housing, a hose and a receptacle for holding the water.

In these respects, the rainwater saver system according to the present invention substantially departs from the conventional concepts and designs of the prior art, and in so doing provides an apparatus primarily developed for the purpose of collecting rain water and redistributing it to be used for various purposes.

SUMMARY OF THE INVENTION

In view of the foregoing disadvantages inherent in the known types of water conservation systems now present in the prior art, the present invention provides a new rainwater saver system construction wherein the same can be utilized for collecting rain water and redistributing it to be used for various purposes.

The general purpose of the present invention, which will be described subsequently in greater detail, is to provide a new rainwater saver system apparatus and method which has many of the advantages of the water conservation systems mentioned heretofore and many novel features that result in a new rainwater saver system which is not anticipated, rendered obvious, suggested, or even implied by any of the prior art water conservation systems, either alone or in any combination thereof.

To attain this, the present invention generally comprises an inlet means, a first outlet means, a housing, a hose and a receptacle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rainwater saver system apparatus and method which has many of the advantages of the water conservation systems mentioned heretofore and many novel features that result in a new rainwater saver system which is not anticipated, rendered obvious, suggested, or even implied by any of the prior art water conservation systems, either alone or in any combination thereof.

It is another object of the present invention to provide a new rainwater saver system which may be easily and efficiently manufactured and marketed.

It is a further object of the present invention to provide a new rainwater saver system which is of a durable and reliable construction.

An even further object of the present invention is to provide a new rainwater saver system which is susceptible of a low cost of manufacture with regard to both materials and labor, and which accordingly is then susceptible of low prices of sale to the consuming public, thereby making such rainwater saver system economically available to the buying public.

Still yet another object of the present invention is to provide a new rainwater saver system which provides in the apparatuses and methods of the prior art some of the advantages thereof, while simultaneously overcoming some of the disadvantages normally associated therewith.

Still another object of the present invention is to provide a new rainwater saver system for collecting rain water and redistributing it to be used for various purposes.

Yet another object of the present invention is to provide a new rainwater saver system which includes an inlet means, a first outlet means, a housing, a hose and a receptacle.

Still yet another object of the present invention is to provide a new rainwater saver system that provides versatility in saving rain water and then redistributing it so that it can be stored and/or used for gardening purposes.

Even still another object of the present invention is to provide a new rainwater saver system that is small and available in a variety of colors which would make it fairly unobtrusive and therefore not destroying the aesthetics of homes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 a cross sectional view taken along line 4—4 of FIG. 2 and particularly illustrating an overflow water flow condition through the invention.

FIG. 6 is a cross sectional view taken along line 6—6 of FIG. 1.

DESCRIPTION OF THE PREFERRED EMBODIMENT

Figure 1:
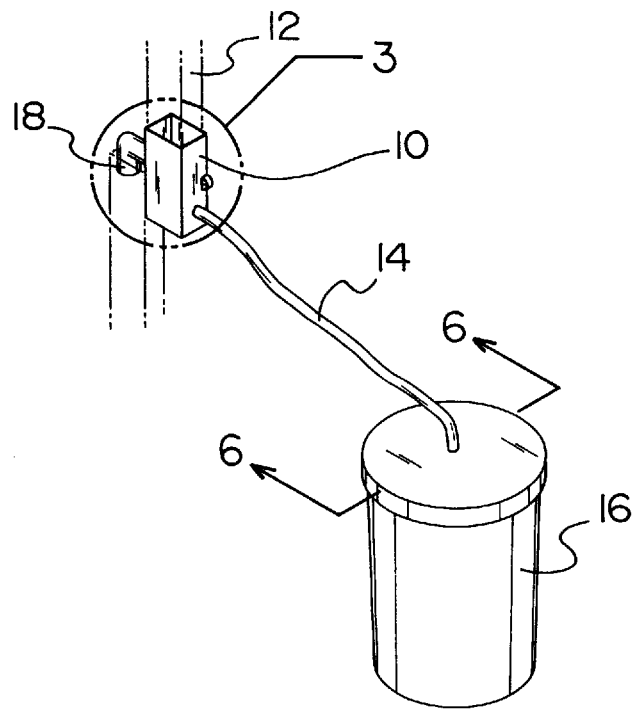
FIG. 1 is a right side perspective view of a new rainwater saver system according to the present invention.
Figure 2:
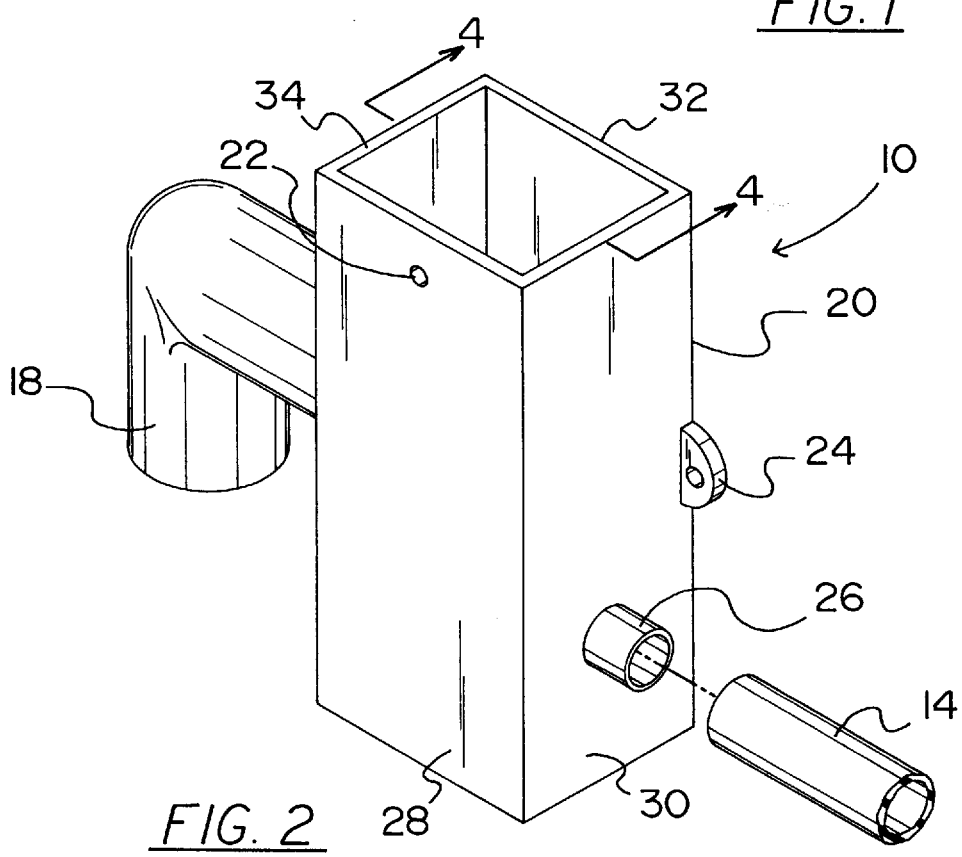
FIG. 2 is a side perspective view thereof.
Figure 4:
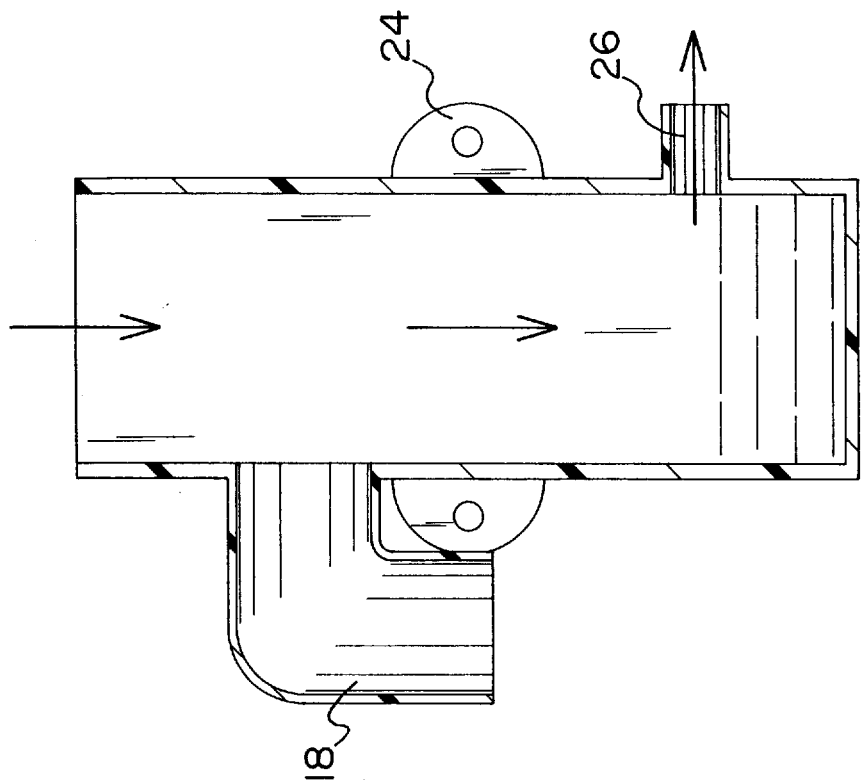
FIG. 4 is a cross sectional view taken along line 4—4 of FIG. 2 and particularly illustrating a normal water flow condition through the invention.
Figure 3:
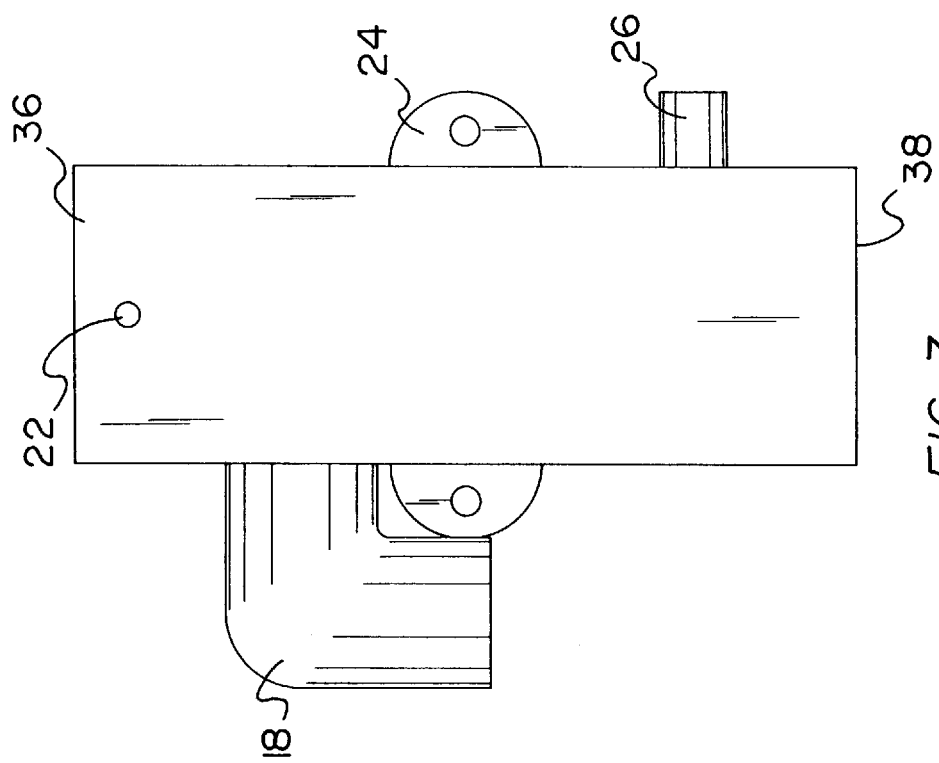
FIG. 3 is a front elevation view of the invention.

With reference now to the drawings, and in particular to FIGS. 1 through 6 thereof, a new rainwater saver system embodying the principles and concepts of the present invention and generally designated by the reference numeral 10 will be described.

More specifically, it will be noted that the rainwater saver system 10 comprises an inlet means, a first outlet means, a housing, a hose and a receptacle.

As best illustrated in FIGS. 1 through 6, it can be shown that the present invention provides a novel and nonobvious system for conserving water.

In use, a rainwater saver system 10 includes a housing 20 comprising a front panel 28 fixedly joined to first 30 and second 34 side panels, which in turn are fixedly joined to a back panel 32. A bottom panel 38 is fixedly joined to the front 28, first 30 and second 34 side panels and the back panel 32. The top 36 of the housing 20 has an opening which allows water to flow in from the inlet means 12, which is typically a drain pipe originating at and in fluid communication with the eaves trough or gutter of a building. The first outlet means 18 extends from the second side panel 34. A hose 14 is removably attached to the first side panel 30. A receptacle 16 is provided for collecting and holding diverted rain water until it is utilized.

The receptacle 16 is coupled to the hose 14. The housing 20 preferably comprises a molded plastic part to thereby avoid corrosion problems. (The housing 20 may optionally comprise a non-corrosive metal.) The first outlet means 18 preferably acts as an overflow drain pipe which channels water to the place where rain water is typically drained, such as the lawn adjacent a building. The hose 14 preferably comprises rubber tubing. The receptacle 16 can be any means for holding water, such as a garbage can. A bracket means 24 is preferably included on the housing 20 for holding the System 10 in position against a building. The System 10 can be any shape, but preferably is a substantially rectangular-shaped box. Illustratively, the rectangular-shaped box measures about 9 to 10 inches high, about 4 inches long, and about 3 ½ inches wide. The System 10 further comprises a connecting means 22, such as a connecting aperture, for receiving a fastener (not shown) passing through a hole in the inlet means 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rainwater saver system comprising:

a housing having an interior, said housing including four substantially vertical side panels, a substantially horizontal bottom panel enclosing the lower end of said housing, and a top with an opening adapted to permit water to flow into the interior of said housing from an inlet means for collecting and directing water flow; a first outlet aperture being positioned in one of said side panels, and a second outlet aperture for distributing water to a rainwater collection receptacle, said second outlet aperture being positioned in one of said side panels, wherein said first outlet aperture is located at a vertically higher level from said bottom panel than said second outlet aperture;

a receptacle for receiving rainwater from said housing, said receptacle being connected to said second outlet aperture, said housing being positioned at a vertically higher position than said receptacle such that water within said interior flows through said second outlet aperture into said receptacle; and an L-shaped outlet pipe, said L-shaped outlet pipe having a first end and a second end, said first end being coupled to said housing around said first outlet aperture such that said interior is in fluid communication with said outlet pipe, said second end being adapted for engaging a drain pipe such that overflow from said receptacle backs up into said interior and flows out of said first outlet aperture through said outlet pipe and into said drain pipe.

2. The rainwater saver system of claim 1, wherein the opening in the top of the housing is of a size and shape adapted to connect to a gutter down pipe.

3. The rainwater saver system of claim 1, wherein the first outlet aperture is adapted for connecting to a drain pipe for removing overflow water from said housing.

4. The rainwater saver system of claim 1, further comprising a bracket means adapted for attaching said housing to a support structure, said bracket means being coupled to said housing.

5. The rainwater saver system of claim 4, wherein the bracket means are located on said housing in a manner permitting positioning of the bracket means against a building.

6. The rainwater saver system of claim 1, wherein the housing comprises a rectangular-shaped box.

7. The rainwater saver system of claim 6, wherein the rectangular-shaped box measures about 9 to 10 inches high, about 4 inches long, and about 3 ½ inches wide.

8. The rainwater saver system of claim 1, further comprising a connecting means for connecting said housing to the inlet means.

9. The rainwater saver system of claim 8, wherein the connecting means is adapted for connecting said housing to a gutter down pipe.

10. The rainwater saver system of claim 1, wherein said second end of said outlet pipe faces in a downward direction.

11. A rainwater saver system of claim 10, further comprising a bracket means adapted for attaching said housing to a support structure, said bracket means being coupled to said housing.

12. The rainwater saver system of claim 11, wherein the bracket means are located on said housing in a manner permitting positioning of the bracket means against a building.

13. The rainwater saver system of claim 1, wherein said housing is constructed from one material selected from the group of materials consisting of molded plastic and non-corrosive metal.

14. The rainwater saver system of claim 1, wherein said first outlet is located a first distance above said horizontal bottom panel and wherein said second outlet is located a second distance above said horizontal bottom panel, and wherein said first distance is about three times greater than said second distance.

15. A rainwater saver system comprising, in combination:

a building having a plurality of drain pipes, said plurality of drain pipes being for collecting rainwater and directing the rainwater to a main drain pipe;

a housing having an interior, said housing including four substantially vertical side panels, a substantially horizontal bottom panel enclosing the lower end of said housing, and a top with an opening adapted to permit water to flow into the interior of said housing from said main drain pipe of said building for collecting and directing water flow from said main drain pipe of the building; a first outlet aperture being positioned in one of said side panels, and a second outlet aperture for distributing water to a rainwater collection receptacle, said second outlet aperture being positioned in one of said side panels, wherein said first outlet aperture is located at a vertically higher level from said bottom panel than said second outlet aperture;

a collection receptacle for receiving rainwater from said housing, said receptacle being connected to said second outlet aperture by a hose, said housing being positioned at a vertically higher position than said receptacle such that water within said interior flows through said second outlet aperture through said hose and into said receptacle;

wherein the opening in the top of the housing is of a size and shape to connect to the main drain pipe of the building;

said first outlet aperture being for connecting to a first outlet drain pipe for removing overflow water from said housing;

a bracket means for attaching said housing to said building, said bracket means being coupled to said housing;

wherein the bracket means are located on said housing in a manner permitting positioning of the bracket means against the building, said bracket means including a pair of oppositional mounting ears disposed from said housing, each of said mounting ears having a rounded outer perimeter and a hole, the hole being adapted for receiving an anchor means attaching said housing to the building;

wherein the housing comprises a rectangular-shaped box.;

wherein the rectangular-shaped box measures about 9 to 10 inches high, about 4 inches long, and about 3 ½ inches wide;

a connecting means for connecting said housing to the main drain pipe of the building;

wherein said first outlet drain pipe comprises an L-shaped outlet pipe, said L-shaped outlet pipe having a first end and a second end, said first end being coupled to said housing around said first outlet aperture such that said interior is in fluid communication with said outlet pipe, said second end being adapted for engaging a drain pipe such that overflow from said receptacle backs up into said interior and flows out of said first outlet aperture through said outlet pipe and into said drain pipe;

wherein said second end of said outlet pipe faces in a downward direction;

a bracket means adapted for attaching said housing to a support structure, said bracket means being coupled to said housing;

wherein the bracket means are located on said housing in a manner permitting positioning of the bracket means against said building.

wherein said housing is constructed from one material selected from the group of materials consisting of molded plastic and non-corrosive metal; and wherein said first outlet is located a first distance above said horizontal bottom panel and wherein said second outlet is located a second distance above said horizontal bottom panel, and wherein said first distance is about three times greater than said second distance.

* * * * *